United States Patent Office 2,831,892
Patented Apr. 22, 1958

2,831,892

N-(3-ISOPROPYLAMINOPROPYL)DIPHENYL-ACETAMIDE AND PROCESSES

Clinton A. Dornfeld, Glenview, Ill., assignor to G. D. Searle & Co., Chicago, Ill., a corporation of Delaware No Drawing. Application March 22, 1956
Serial No. 573,102

1 Claim. (Cl. 260—558)

This invention relates to N-(3-isopropylamino-propyl) diphenylacetamide, its salts, and processes for the manufacture thereof.

The present invention provides compositions characterized by a diversity of valuable pharmacological properties, among the most important of which are certain highly desirable effects on the cardiovascular system. Thus, and in particular, the subject compounds are potent eurhythmic agents especially beneficial in the treatment of ventricular chronotropic dysfunctions of the heart muscle. They operate to bring about a reversion of fibrillation or flutter which commends their application in an assortment of cardiac conditions associated with rhythm changes of the heart caused by disturbances in the regular automaticity or conductance pattern of its beat.

Corollary to their eurhythmic action, the substances here disclosed exert—in particular species— an appreciable hypotensive effect. Moreover, certain of the compounds set forth are spasmolytic agents.

N - (3 - isopropylaminopropyl)diphenylacetamide itself may be represented by the structural formula

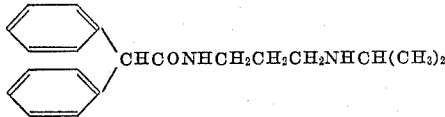

Equivalent to this material for the purposes of the present invention are non-toxic acid-addition salts of the described base having the formula

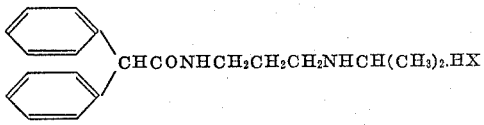

wherein X represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, nicotinate, or the like—which, in combination with the cationic portion of a salt aforesaid, is neither pharmacologically nor otherwise undesirable in pharmaceutical dosage.

The basic amide to which this invention relates is relatively insoluble in water, but may be dissolved in dilute acids and such of the common organic solvents as ethanol, 2-propanol, acetone, butanone, and ether. The acid-addition salts of this invention are, on the other hand, soluble in water and in aqueous solutions of alcohol or other water-miscible organic solvents. The subject compounds may be administered in solid form as tablets or capsules; dissolved or suspended in aqueous media, they may be given parenterally.

A variety of methods have been found suitable for manufacturing the compounds of the present discovery, the most preferable, however, being that which makes use of diphenylacetic acid as a starting material. The acid is heated with N-isopropyl-1,3-propanediamine to produce the claimed base, which may be purified either by direct distillation or by distillation subsequent to partitioning between aqueous muriatic acid and chloroform. The reaction is ordinarily carried out at temperatures in the range from 100° to 200° centigrade; and it is generally advantageous to proceed in a solvent such as benzene, toluene, xylene, p-cymene, tetralin, or like inert organic liquid capable of forming a minimum-boiling azeotrope with water. Where operating temperatures exceed the boiling point of a solvent of choice, the reaction is housed in a sealed system.

A somewhat less favored but substantially alternative process of preparing the amido base substitutes diphenylacetyl chloride for the corresponding acid as a starting material, the reaction with N-isopropyl-1,3-propanediamine being in this case carried out at 25–100° centigrade using ether, a ketonic solvent such as acetone and butanone, or a chlorinated hydrocarbon such as chloroform as the reaction medium. Here again, a closed system is employed when the boiling point of a selected solvent is below the operating temperature.

Conversion of the amide base of this invention to corresponding acid-addition salts is accomplished by simple admixture of the base with 1 equivalent of any of various inorganic and strong organic acids, the anionic portion of which conforms to X as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed temperatures are given in degrees centigrade (° C.), pressures in millimeters (mm.) of mercury, and relative amounts of materials in parts by weight, except as otherwise noted.

EXAMPLE 1

*N-(3-isopropylaminopropyl)diphenylacetamide*

To a refluxing solution of 345 parts of N-isopropyl-1,3-propanediamine in 1750 parts of xylene is added 636 parts of diphenylacetic acid, a trap being provided to remove water formed in process. Water begins to separate almost at once, indicating formation of the desired amide. After approximately 90 hours at reflux temperatures, the reaction mixture is allowed to cool and crystallize. The solid product is filtered out and then taken up in warm dilute muriatic acid. N-(3-isopropylaminopropyl)diphenylacetamide obtained thus in solution is separated from such by-products as N-isopropyl-N'-trimethylenebisacetamide by repeated partitioning between (warm aqueous muriatic) acid and chloroform, the chloroform extract each time being evaporated to dryness and the residue taken up in acid for further partitioning with chloroform until, on alkalization of a sample of the aqueous phase, no further precipitation occurs. The aqueous fractions are then combined and made basic, so precipitating N-(3-isopropylaminopropyl)diphenylacetamide as a solid which is still further purified by distillation in vacuo. The product boils at 200° C. under 0.1 mm. pressure, and melts at around 184° C.

EXAMPLE 2

*N-(3-isopropylaminopropyl)diphenylacetamide hydrochloride*

To 800 parts of 2-propanol containing 35 parts of hydrogen chloride is added 275 parts of N-(3-isopropylaminopropyl)diphenylacetamide. A precipitate forms almost at once. The mixture is briefly heated, with agitation, then chilled to around 5° C. The white crystalline product which results is isolated on a filter and dried in vacuo at 75° C. N-(3-isopropylaminopropyl)diphenylacetamide hydrochloride thus obtained melts at 166–167° C.

EXAMPLE 3

*N-(3-isopropylaminopropyl)diphenylacetamide*

To 182 parts of N-isopropyl-1,3-propanediamine in 700 parts of anhydrous ether is added, with agitation during 1 hour at reflux temperatures, 182 parts of diphenylacetyl chloride dissolved in 700 parts of anhydrous ether. Reflux with agitation is maintained for 1 hour longer, whereupon 40 parts of caustic soda dissolved in 500 parts of water is mixed in. The ethereal phase is separated and the aqueous layer is then extracted once with ether. The two ether layers are combined, dried over anhydrous potassium carbonate, and stripped of solvent by evaporation with steam. The residue solidifies on standing. Distillation at 0.2 mm. pressure affords N-(3-isopropylaminopropyl)diphenylacetamide identical with that obtained by the procedure of Example 1. The liquid distillate is poured into butanone to crystallize in the cold.

What is claimed is:

N-(3-isopropylaminopropyl)diphenylacetamide.

References Cited in the file of this patent

UNITED STATES PATENTS 2,009,144   Miescher et al. _____ July 23, 1935